United States Patent
Jung

(10) Patent No.: US 7,044,706 B2
(45) Date of Patent: May 16, 2006

(54) APPARATUS FOR MANIPULATING A VEHICLE BODY PANEL

(75) Inventor: Jae Hwan Jung, Asan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/750,684

(22) Filed: Dec. 31, 2003

(65) Prior Publication Data
US 2005/0008469 A1    Jan. 13, 2005

(30) Foreign Application Priority Data
Jul. 7, 2003    (KR)    ............... 10-2003-0045724

(51) Int. Cl.
*B25J 15/08*    (2006.01)

(52) U.S. Cl. .................. 414/737; 414/736; 901/40; 294/64.1; 294/119.1

(58) Field of Classification Search ............... 414/729, 414/736, 741, 737; 901/7, 40; 29/430, 434; 294/87.26, 64.1, 119.1
See application file for complete search history.

(56) References Cited

U.S. PATENT DOCUMENTS

| | | | | |
|---|---|---|---|---|
| 4,579,380 A | * | 4/1986 | Zaremsky et al. | ....... 294/119.1 |
| 4,627,785 A | * | 12/1986 | Monforte | ............ 414/730 |
| 5,538,305 A | * | 7/1996 | Conway et al. | ......... 294/119.1 |

FOREIGN PATENT DOCUMENTS

JP    2001-047327    2/2001

* cited by examiner

*Primary Examiner*—Donald W. Underwood
(74) *Attorney, Agent, or Firm*—Morgan Lewis & Bockius LLP

(57) ABSTRACT

Manipulating a vehicle body panel includes utilizing a base plate, left and right screw rods, a motor, and clamping units. The base plate is connected to the arm of the robot. The left and right screw rods are rotatably mounted below the base plate by bearing blocks and each of the screw rods has a driven helical gear at an interior end thereof. The motor is disposed central to and above the base plate and has a rotating shaft. A driving helical gear is formed at an end of the rotating shaft and is engaged with both of the driven helical gears. The clamping units are respectively mounted to the left and right screw rods by a screw block. The clamping units clamp the vehicle body panel by laterally moving with respect to the base plate and move the vehicle body panel up and down.

8 Claims, 5 Drawing Sheets

APPARATUS FOR MANIPULATING A VEHICLE BODY PANEL

CROSS-REFERENCE TO RELATED APPLICATIONS

This application claims priority of Korean Application No. 10-2003-0045724, filed on Jul. 7, 2003, the disclosure of which is incorporated fully herein by reference.

FIELD OF THE INVENTION

Generally, the present invention relates to an apparatus for manufacturing a vehicle body. More particularly, the present invention relates to an apparatus for manipulating a vehicle body panel during manufacturing of the vehicle.

BACKGROUND OF THE INVENTION

While a vehicle is manufactured, many parts, reaching up to about twenty to thirty thousand, are assembled and/or welded in the manufacturing process. In an assembly process of the vehicle body, a body panel, such as a trunk lid, is manipulated to be moved to an assembly line, e.g., using an overhead loader.

An apparatus for manipulating a vehicle body panel, such as a trunk lid typically includes rotation blocks that rotate on their hinges by first cylinders at both sides of a base plate. The base plate is connected to an overhead loader and clamps. Each clamp is mounted at each rotation block and clamps an end of the trunk lid with a locator.

Such a typical apparatus for manipulating a vehicle body panel is usually dedicated for exclusive use with a specific body panel, such as a trunk lid. It is generally believed that a very complex structure of such a clamp and many peripheral devices are required to cope with various types of vehicles, which in turn implies necessity of a large space for such apparatus for manipulating vehicle body panels. In addition, a relative high deviation occurs in an assembling position after the apparatus has moved the vehicle body panel to a desired assembly position. Therefore, a worker must manually adjust a position of the vehicle body panel while mounting the vehicle body panel to an exact assembly position of the vehicle.

The information disclosed in this Background of the Invention section is only for enhancement of understanding of the background of the invention and should not be taken as an acknowledgement or any form of suggestion that this information forms the prior art that is already known to a person of ordinary skill in the art.

SUMMARY OF THE INVENTION

The present invention provides an apparatus for manipulating a vehicle body panel. The apparatus has non-limiting advantages of common usage for vehicle body panels of various vehicles.

Another embodiment of the present invention provides an apparatus for manipulating a vehicle body panel having non-limiting advantages of reduced deviation in a mounting position when a body panel is manipulated to a required mounting position.

An exemplary apparatus for manipulating a vehicle body panel according to an embodiment of the present invention is mounted to an arm of a robot for moving the vehicle body panel to a required mounting position of a vehicle body. Such an exemplary apparatus includes a base plate, left and right screw rods, a motor, and clamping units. The base plate is connected to the arm of the robot. The left and right screw rods are rotatably mounted below the base plate with bearing blocks and each of the screw rods has a driven helical gear at an interior end thereof. The motor is disposed central to and above the base plate and has a rotating shaft. A driving helical gear is formed at an end of the rotating shaft and is engaged with both of the driven helical gears of the left and right screw rods. The clamping units are respectively mounted to the left and right screw rods by a screw block. The clamping units clamp the vehicle body panel by laterally moving with respect to the base plate and, therefore, move the vehicle body panel up and down.

In a further embodiment, the present invention includes suction units for holding the vehicle body panel. The suction units are respectively disposed adjacent and interior to the clamping units and below the base plate. Also included are gap adjusting units for adjusting a gap between the vehicle body and the vehicle body panel. The gap adjusting units are respectively disposed adjacent and interior to the clamping units.

In another further embodiment, the motor is a servo motor whose revolution speed is controllable.

In a yet another embodiment, the clamping unit includes a guide rail mounted by the screw block to each of the left and right screw rods. A clamp is mounted to the guide rail such that the clamp can slide up and down with respect to the guide rail. Also included is an up/down cylinder for moving the clamp up and down, the up/down cylinder being disposed to a rear end of the guide rail and connected to the clamp through an up/down piston. According to an embodiment, it is preferable that the clamp has an inner side that is fork-shaped such that the vehicle body panel can be inserted thereinto.

It is also preferable that the suction unit includes a mounting bracket mounted below the base plate and a suction cup for holding a surface of the vehicle body panel. The suction cup can be installed at an end of the mounting bracket.

It is preferable that the gap adjusting unit includes an adjusting cylinder mounted downward to the base plate and an adjusting jig mounted to an end of an adjusting piston of the adjusting cylinder such that the gap between the vehicle body and the vehicle body panel is adjusted by the adjusting jig. It is also preferable that the adjusting jig includes an inclined surface for adjusting a gap between the vehicle body and the vehicle body panel by being inserted therebetween.

BRIEF DESCRIPTION OF THE DRAWINGS

The accompanying drawings, which are incorporated in and constitute a part of the specification, illustrate an embodiment of the invention, and, read together with the description, serve to explain the principles of the invention in which.

DETAILED DESCRIPTION OF A PREFERRED EMBODIMENT

Figure 1:
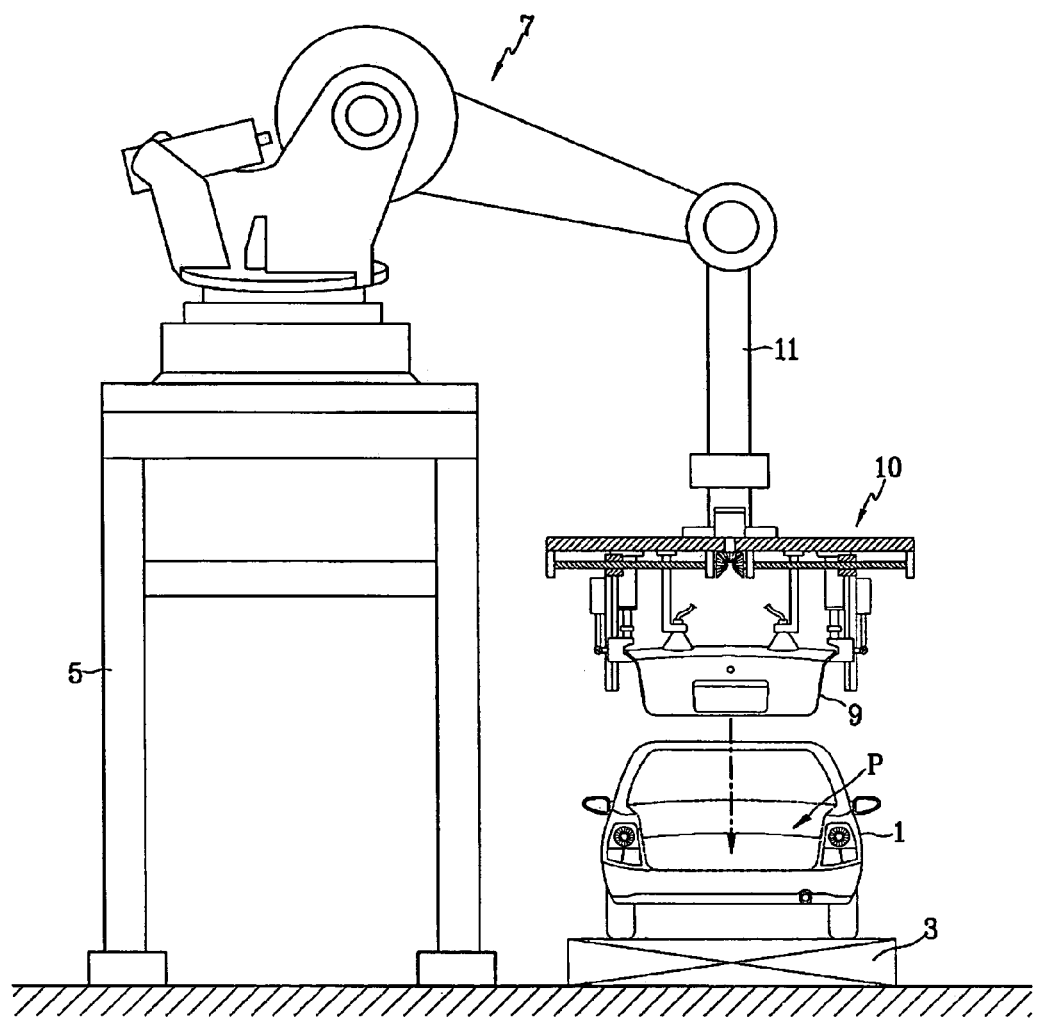
FIG. 1 is a schematic diagram of a robot system including an apparatus for manipulating a vehicle body panel according to an embodiment of the present invention.

According to FIG. 1, utilizing an assembly line for a vehicle body 1, a robot 7 is constructed on a robot supporting frame 5 beside a conveyor apparatus 3 for moving the vehicle body 1. A vehicle body panel, such as a trunk lid 9, is manipulated by an arm 11 of the robot 7 in order to be mounted to the vehicle body 1. An apparatus for manipulating a vehicle body panel 10 is explained hereinafter with respect to an exemplary vehicle body panel consisting of a trunk lid 9 and an assembly line, however, is will be appreciated by one of ordinary skill in the art that the system can be adapted for use with any vehicle body panel.

Figure 2:
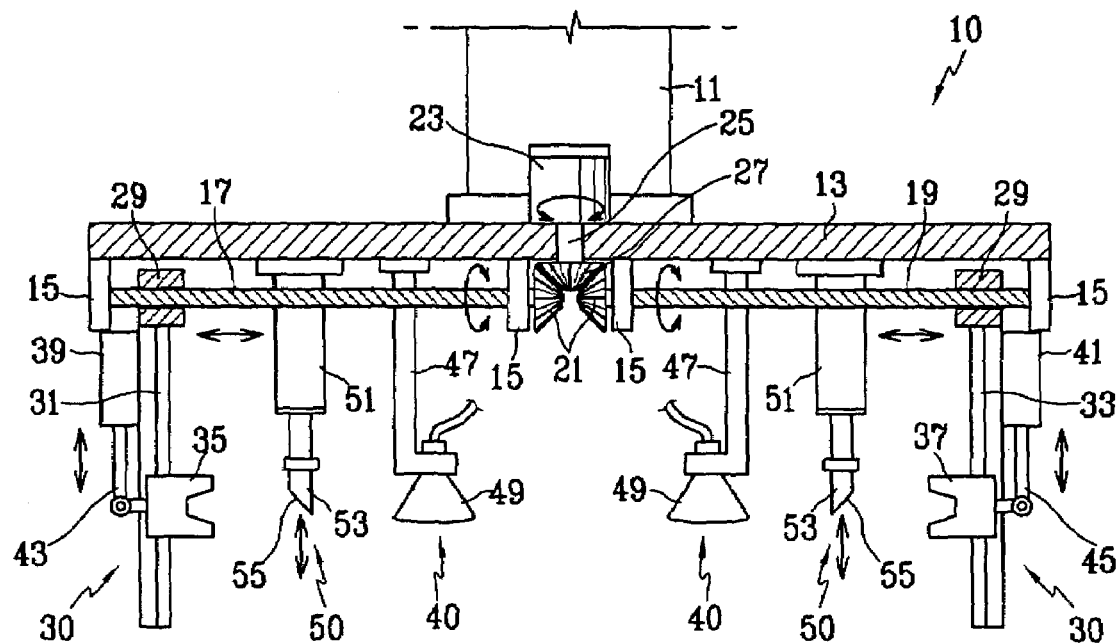
FIG. 2 is a lateral view of an apparatus for manipulating a vehicle body panel according to an embodiment of the present invention.

As shown in FIG. 2, a base plate 13 is mounted at an end 11 of the robot 7. Left and right screw rods are rotatably mounted below the base plate at its right and left sides, by bearing blocks 15. Each of the screw rods 17 and 19 has a driven helical gear 21 at an interior end thereof. A motor 23 is disposed central to and above the base plate 13. The motor 23 has a rotating shaft 25, at an end of which a driving helical gear 27 is formed and engaged with both of the driven helical gears 21. Threads are formed on exterior circumferences of the left and right screw rods 17 and 19 and the left and right screw rods 17 and 19 rotate in opposite directions to each other when the motor 23 rotates. According to a preferred embodiment, the motor 23 is preferably a servo motor whose rotation speed is controllable.

A clamping unit 30 is respectively mounted to each of the left and right screw rods 17 and 19 by a screw block 29. The clamping unit 30 moves laterally with respect to the base plate 13 and clamps the trunk lid 9. The clamping unit 30 moves the vehicle body panel 9 up and down.

The clamping unit 30 includes guide rails 31 and 33, respectively, mounted by the screw blocks 29 to each of the left and right screw rods 17 and 19. Clamps 35 and 37 are, respectively, mounted to the guide rails 31 and 33 such that the clamps 35 and 37 can slide up and down with respect to the guide rails 31 and 33. Up/down cylinders 39 and 41 are disposed to a rear end of the guide rails 31 and 33. Furthermore, up/down pistons 43 and 45 of the up/down cylinders 39 and 41 are connected to rear ends of the clamps 35 and 37. Therefore, the up/down cylinders 39 and 41 can move the clamps 35 and 37 up and down. Inner sides of the clamps 35 and 37 are fork-shaped such that the trunk lid 9 can be inserted therein.

According to an embodiment of the present invention, a suction unit 40 is further included such that it can hold the trunk lid 9 by a suction force. The suction unit 40 is adjacent and interior to the clamping unit 30 and is below the base plate 13. The suction unit 40 includes a mounting bracket 47 mounted pointing downward at the base plate 13 and a suction cup 49 is installed at an end of the mounting bracket 47 such that it can hold a surface of the trunk lid 9.

Additionally, a gap adjusting unit 50 is further included such that it can adjust a gap between the vehicle body 1 and the trunk lid 9. The gap adjusting unit 50 is adjacent and interior to the clamping unit 30.

The gap adjusting unit 50 includes an adjusting cylinder 51 mounted downward of the base plate 13. An adjusting jig 53 is mounted to an end of an adjusting piston of the adjusting cylinder 51 such that the gap between the vehicle body 1 and the trunk lid 9 can be adjusted by the adjusting jig 53. The adjusting jig 53 includes an inclined surface 55 for adjusting the gap between the vehicle body 1 and the trunk lid 9 by being inserted therebetween.

An operation of such an apparatus for manipulating a vehicle body panel according to an embodiment of the present invention is hereinafter described with reference to FIGS. 2–5.

Figure 3:
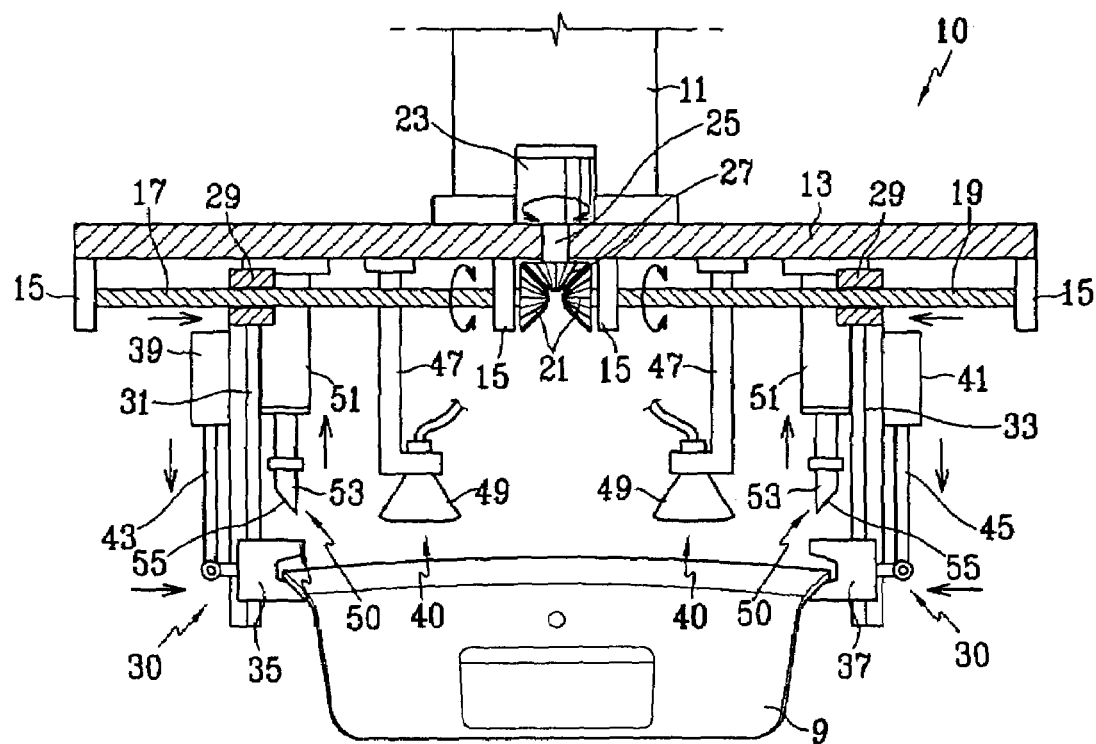
FIGS. 3–5 illustrate an apparatus for manipulating a vehicle body panel according to an embodiment of the present invention at its respective operational stages.

First, as shown in FIG. 2, the up/down cylinders 39 and 41 of the clamping units 30 are operated such that the clamps 35 and 37 are lowered. According to the operation of the up/down cylinders 39 and 41, the clamps 35 and 37 are positioned to positions corresponding to left and right sides of the trunk lid 9. The motor 23 is then driven in its forward direction. Accordingly, as shown in FIG. 3, the clamps 35 and 37, together with the guide rails 31 and 33, move toward the trunk lid 9 such that both sides of the trunk lid 9 are inserted in the forks of the clamps 35 and 37.

Figure 4:
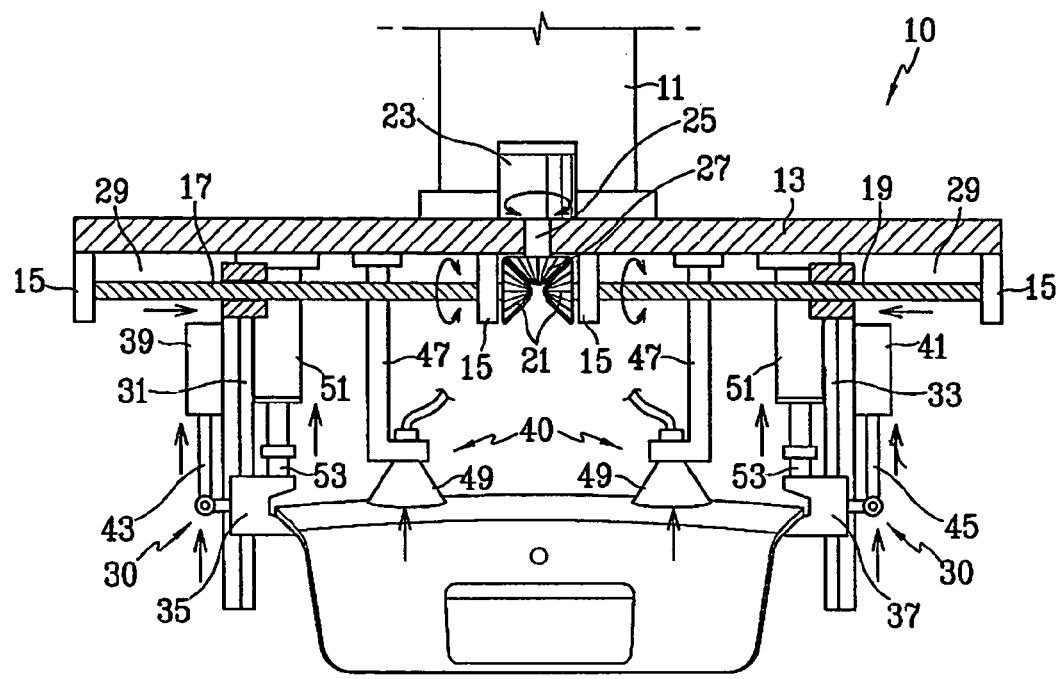
Figure 5:
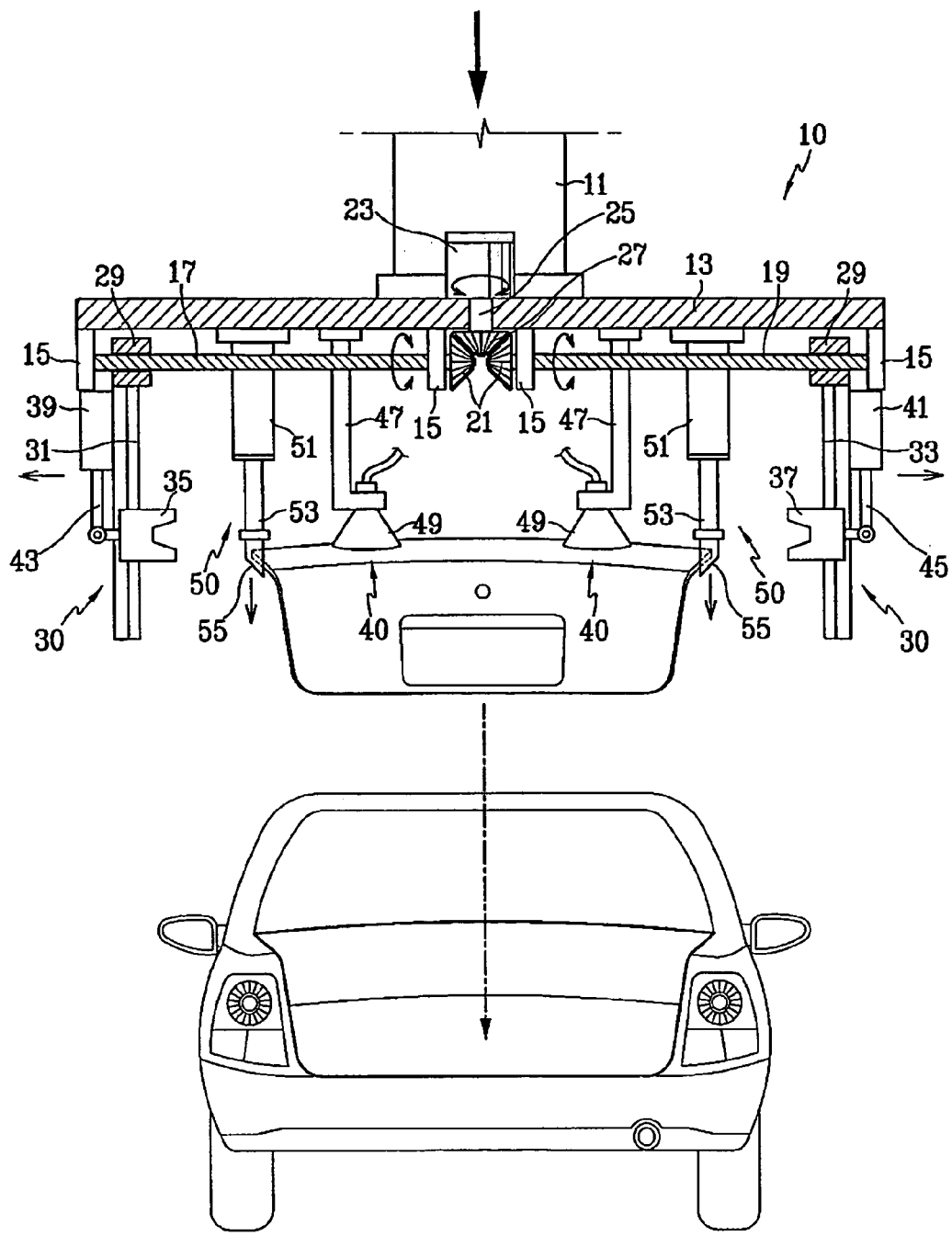

At this time, when the up/down cylinders 39 and 41 are operated in reverse, both clamps 35 and 37 raise the trunk lid 9 along the guide rails 31 and 33, as shown in FIG. 4, Furthermore, an upper side of the trunk lid 9 is suctioned by the suction cup 49. The trunk lid 9 is then manipulated while it is suctioned and held by the suction cup 49.

Having the trunk lid 9 firmly held by the suction cup 49, the robot 7 then moves it to a trunk mounting portion P at a rear of the vehicle body 1 which is positioned by the conveyor apparatus 3. The trunk lid 9 is then lowered to the vehicle body 1 as both clamps 35 and 37 unclamp the trunk lid 9 by moving laterally along with the guide rails 31 and 33 during a reverse operation of the motor 23. In this way the trunk lid 9 is inserted to its correct mounting portion P of the vehicle body 1.

Figure 6:
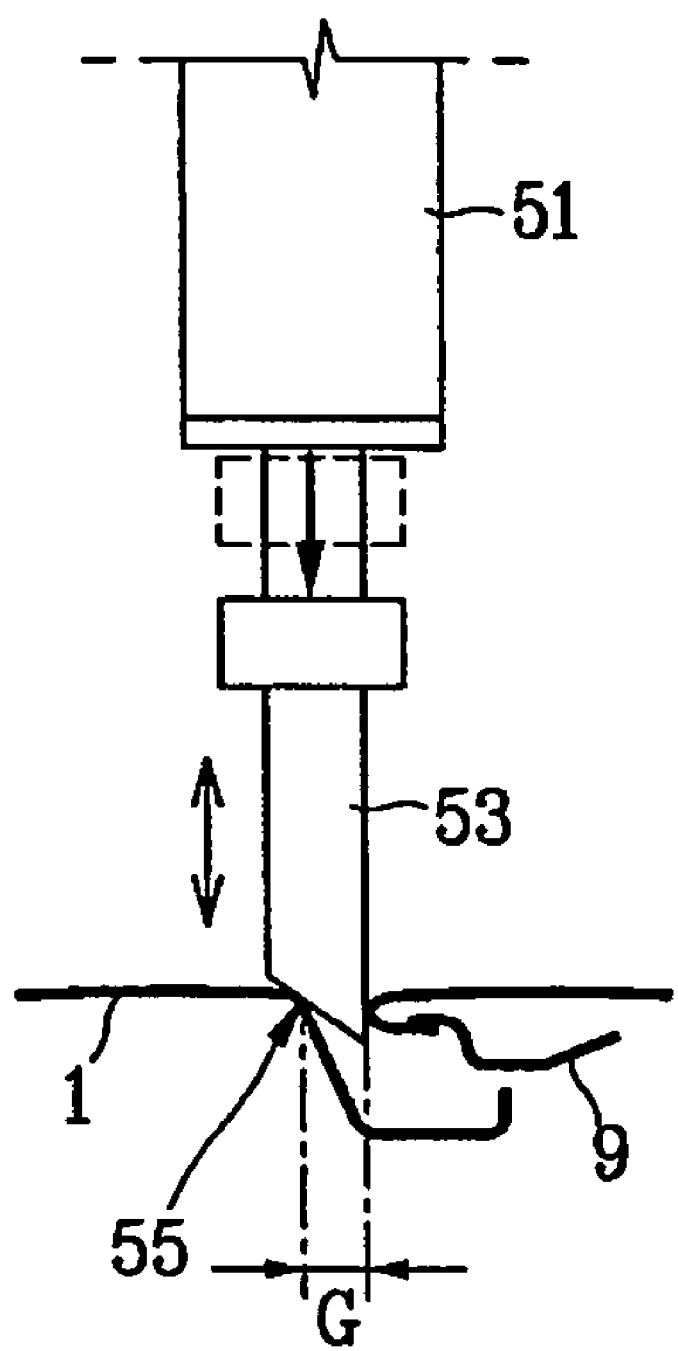
FIG. 6 illustrates operation of a gap adjusting unit of an apparatus for manipulating a vehicle body panel according to an embodiment of the present invention.

At the time when the trunk lid 9 is inserted to the trunk mounting portion P of the vehicle body 1, a suction force of the suction cup 49 is released. At this time, as shown in FIG. 6, the adjusting cylinder 51 moves its adjusting jig 53 such that the jig 53 is inserted between the vehicle body 1 and the trunk lid 9. By such an operation of the adjusting jig 53, the adjusting jig 53 can adjust a gap G between the vehicle body 1 and the trunk lid 9 and accordingly guides the trunk lid 9 to an exact assembling position.

As shown above, according to an embodiment of the present invention, since the trunk lid 9 is clamped by clamps 35 and 37 that have fork-shaped interior sides and move laterally along the left and right screw rods 17 and 19, trunk lids for a variety of vehicles can be manipulated regardless of their specifications, such as their sizes and dimensions.

Additionally, since the trunk lid 9 is manipulated in the state in which it is attached to suction cups 49, deviation in an assembly position of the trunk lid 9 becomes minimal while it is manipulated to its mounting portion. Furthermore, since the adjusting jig 53 finely adjusts the gap G between the vehicle body 1 and the trunk lid 9, accuracy of assembling position becomes enhanced. Also, since such an apparatus for manipulating a vehicle body panel, according to an embodiment of the present invention, is commonly used to cope with vehicle body panels of a variety of vehicle types, costs for assembly lines for manufacturing a variety of vehicles can be reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for manipulating a vehicle body panel, the apparatus being mounted to an arm of a robot for moving a vehicle body panel to a required mounting position of a vehicle body, the apparatus comprising:
   a base plate connected to an arm of a robot;
   left and right screw rods rotatably mounted below the base plate by bearing blocks, each of the screw rods having a driven helical gear at an interior end thereof;
   a motor disposed central to and above the base plate and having a rotating shaft of which an end has a driving helical gear engaged with both of the driven helical gears of the left and right screw rods;
   clamping means for clamping the vehicle body panel by laterally moving with respect to the base plate, and for moving the vehicle body panel up and down, wherein the clamping means comprises:
      a guide rail mounted by a screw block to each of the left and right screw rods:
      a clamp mounted to the guide rail such that the clamp can slide up and down with respect to the guide rail: and
      an up/down cylinder for moving the clamp up and down, the up/down cylinder being disposed to a rear end of the guide rail and being connected to the clamp through an up/down piston;
   a suction unit for holding the vehicle body panel, the suction unit being adjacent and interior to the clamping unit and also being below the base plate; and
   a gap adjusting unit for adjusting a gap between the vehicle body and the vehicle body panel, the gap adjusting unit being adjacent and interior to the clamping means.

2. The apparatus of claim 1, wherein the motor is a servo motor whose revolution speed is controllable.

3. The apparatus of claim 1, wherein the clamp has an inner side that is fork-shaped such that the vehicle body panel is inserted thereinto.

4. The apparatus of claim 1, wherein the suction unit comprises:
   a mounting bracket mounted downward at the base plate; and
   a suction cup for holding a surface of the vehicle body panel, the suction cup being installed at an end of the mounting bracket.

5. The apparatus of claim 1, wherein the gap adjusting unit comprises:
   an adjusting cylinder mounted downward from the base plate; and
   an adjusting jig mounted to an end of an adjusting piston of the adjusting cylinder such that the gap between the vehicle body and the vehicle body panel is adjusted by the adjusting jig.

6. The apparatus of claim 5, wherein the adjusting jig comprises an inclined surface for adjusting a gap between the vehicle body and the vehicle body panel by being inserted therebetween.

7. An apparatus for manipulating a vehicle body panel, the apparatus being mounted to an arm of a robot for moving a vehicle body panel to a required mounting position of a vehicle body, the apparatus comprising:
   a base plate connected to an arm of a robot;
   left and right screw rods rotatably mounted below the base plate by bearing blocks, each of the screw rods having a driven helical gear at an interior end thereof
   a motor disposed central to and above the base plate and having a rotating shaft of which an end has a driving helical gear engaged with both of the driven helical gears of the left and right screw rods; and
   a clamping unit mounted to each of the left and right screw rods by a screw block, wherein the clamping unit comprises a guide rail mounted by the screw block to each of the left and right screw rods, a clamp mounted to the guide rail such that the clamp can slide up and down with respect to the guide rail, and an up/down cylinder for moving the clamp up and down, the up/down cylinder being disposed to a rear end of the guide rail and being connected to the clamp through an up/down piston such that the vehicle body panel is clamped by laterally moving with respect to the base plate and is moved up and down.

8. The apparatus of claim 7, wherein the clamp has an inner side that is fork-shaped such that the vehicle body panel is inserted thereinto.

* * * * *